(12) United States Patent
Seidel et al.

(10) Patent No.: US 6,914,090 B2
(45) Date of Patent: Jul. 5, 2005

(54) IMPACT-RESISTANT AND FLAMEPROOFED POLYCARBONATE MOLDING COMPOSITIONS

(75) Inventors: Andreas Seidel, Dormagen (DE); Thomas Eckel, Dormagen (DE); Dieter Wittmann, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 110 days.

(21) Appl. No.: 10/277,824

(22) Filed: Oct. 22, 2002

(65) Prior Publication Data

US 2003/0109612 A1 Jun. 12, 2003

(30) Foreign Application Priority Data

Oct. 26, 2001 (DE) .......................................... 101 52 318

(51) Int. Cl.$^7$ .................... C08K 5/523; C08K 5/526; C08K 3/34
(52) U.S. Cl. ................ 524/127; 524/116; 524/117; 524/126; 524/138; 524/449; 524/451; 524/456
(58) Field of Search ................ 524/116–117, 126–127, 524/138, 449, 451, 456

(56) References Cited

U.S. PATENT DOCUMENTS

| | | | |
|---|---|---|---|
| 5,091,461 A | 2/1992 | Skochdopole | 524/493 |
| 5,162,419 A | 11/1992 | Pottier-Metz et al. | 524/451 |
| 5,204,394 A | 4/1993 | Gosens et al. | 524/125 |
| 5,672,645 A * | 9/1997 | Eckel et al. | 524/127 |
| 5,723,526 A | 3/1998 | Nagasawa | 524/451 |
| 5,733,957 A * | 3/1998 | Podszun et al. | 524/127 |
| 5,849,827 A | 12/1998 | Bödiger et al. | 521/423 |
| 5,961,915 A | 10/1999 | Toyouchi et al. | 264/572 |
| 5,965,655 A | 10/1999 | Mordecai et al. | 524/456 |
| 6,174,945 B1 * | 1/2001 | Kim et al. | 524/127 |
| 6,403,683 B1 * | 6/2002 | Kobayashi | 524/115 |
| 6,414,107 B1 * | 7/2002 | Zobel et al. | 528/196 |
| 6,433,082 B1 * | 8/2002 | Eckel et al. | 525/67 |
| 6,441,068 B1 * | 8/2002 | Eckel et al. | 524/127 |
| 6,448,316 B1 | 9/2002 | Hirano et al. | 524/127 |
| 6,528,561 B1 * | 3/2003 | Zobel et al. | 524/125 |
| 6,569,930 B1 * | 5/2003 | Eckel et al. | 524/127 |
| 6,590,015 B1 * | 7/2003 | Eckel et al. | 524/127 |
| 6,596,800 B1 * | 7/2003 | Zobel et al. | 524/432 |
| 6,613,822 B1 * | 9/2003 | Eckel et al. | 524/116 |
| 6,686,404 B1 * | 2/2004 | Eckel et al. | 524/127 |
| 6,706,788 B2 * | 3/2004 | Eckel et al. | 524/127 |
| 6,727,301 B1 * | 4/2004 | Eckel et al. | 524/127 |

FOREIGN PATENT DOCUMENTS

| | | | |
|---|---|---|---|
| DE | 100 10 941 | | 9/2001 |
| DE | 100 14 608 | | 9/2001 |
| EP | 0 994 155 | | 4/2000 |
| EP | 1 038 920 | | 9/2000 |
| JP | 11-199678 | * | 7/1999 |
| WO | 98/51737 | | 11/1998 |
| WO | 00/39210 | | 7/2000 |
| WO | 00/46298 | | 8/2000 |

* cited by examiner

Primary Examiner—Peter Szekely
(74) Attorney, Agent, or Firm—Joseph C. Gil; Aron Preis

(57) ABSTRACT

An impact resistant, flame-resistant thermoplastic molding composition suitable for making thin-wall housing parts is disclosed. The composition contains A) 50 to 90 parts by weight of at least one a member selected from the group consisting of polycarbonate and polyester carbonate, B) 5 to 20 parts by weight of rubber-modified vinyl (co)polymer C) 2 to 15 parts by weight of at least one low-volatility, halogen-free flameproofing agent, D) 0.1 to 6 parts by weight of a silicate mineral, and optional E) fluorinated polyolefin, and F) conventional polymer additive wherein the total sum of the parts by weight of the components A) to F) is 100, and wherein the rubber content of the composition referred to the weight of the composition is 2 to 6 wt.-%.

17 Claims, No Drawings

IMPACT-RESISTANT AND FLAMEPROOFED POLYCARBONATE MOLDING COMPOSITIONS

FIELD OF THE INVENTION

The present invention relates to thermoplastic molding compositions containing polycarbonate.

SUMMARY OF THE INVENTION

An impact resistant, flame-resistant thermoplastic molding composition suitable for making thin-wall housing parts is disclosed. The composition contains A) 50 to 90 parts by weight of at least one member selected from the group consisting of polycarbonate and polyester carbonate, B) 5 to 20 parts by weight of rubber-modified vinyl (co)polymer C) 2 to 15 parts by weight of at least one low-volatility, halogen-free flameproofing agent, D) 0.1 to 6 parts by weight of a silicate mineral, and optional E) fluorinated polyolefin, and F) optionally conventional polymer additives wherein the total sum of the parts by weight of the components A) to F) is 100, and with the proviso that the rubber content of the composition is of 2 to 6 wt-% relative to the composition.

BACKGROUND OF THE INVENTION

Halogen-free flameproofed PC/ABS molding compositions are generally known.

Thus for example, flameproofed PC/ABS compositions that contain low-volatility oligomeric phosphoric acid esters as flame-retardant additive are described in U.S. Pat. No. 5,204,394. The molding compositions are characterized by a good thermal shape stability of molded bodies and flow line strength, and with a wall thicknesses of 1.6 mm have a V-0 rating in the UL 94 V flame resistance test. However, such a rating is not sufficient for many thin-wall applications. In order to achieve a satisfactory flame resistance also with thinner wall thicknesses, relatively large amounts of the plasticizing flame-retardant additive have to be added. Such molding compositions have an inadequate thermal shape stability and tend to form burning droplets in the aforementioned flame test, with the result that they achieve only a V-2 rating in the UL 94 V test.

In U.S. Pat. No. 5,849,827, it is disclosed that the afterburning times of PC/ABS molding compositions containing flameproofing agents can be reduced by adding nanoscale inorganic materials. The tendency to form burning droplets, especially in the case of thin wall thicknesses is, however, unaffected thereby.

PC/ABS compositions that contain silicate minerals are also known.

These reinforcing minerals may be used in order to obtain a very wide range of effects. They are used for example in order to have a positive effect on the stiffness and dimensional stability of the compositions. EP-A 0 391 413 describes PC/ABS molding compositions reinforced with platelet-shaped inorganic fillers, which are characterized by a low coefficient of thermal expansion as well as by a good toughness and thermal stability. U.S. Pat. No. 5,965,655 describes PC/ABS compositions to which special wollastonites are added in order to reduce the coefficient of thermal expansion, and which are characterized by an improved surface appearance combined with a good impact resistance. EP-A 0 452 788 describes PC/ABS molding compositions to which talcum is added in order to reduce the degree of surface gloss. WO 98/51737 describes PC/ABS compositions containing mineral fillers such as talcum and wollastonite that have improved thermal stability, melt flowability, dimensional stability and low-temperature toughness. EP-A 1 038 920 describes inter alia PC/ABS molding compositions reinforced with talcum and wollastonites that have an improved stability to hydrolysis. However, all these molding compositions are not flameproofed molding compositions, and are thus materials that do not pass the UL 94 V test.

Flameproofed PC/ABS molding compositions containing silicate minerals are also known.

PC/ABS molding compositions containing platelet-shaped minerals such as talcum and which are flameproofed with readily volatile monophosphates or halogen-containing additives are described in EP-A 0 641 827. Although the aforedescribed molding compositions have a high modulus of elasticity, they have an insufficient toughness and flow line strength for many thin-wall housing applications.

EP-A 0 754 531 describes PC/ABS molding compositions flameproofed with special low-volatility oligophosphates that contain platelet-shaped fillers such as layer-type aluminosilicates and are characterized by improved dimensional stability. In order to achieve these desired effects, comparatively large amounts of fillers are necessary, whereby a toughness of the molding compositions sufficient for thin-wall applications is no longer ensured.

In WO 00/46298 mixtures of polycarbonate and rubber-modified styrene resins are described that have been flameproofed with phosphoric acid esters and that contain talcum in low concentrations. The described molding compositions are characterized by improved resistance to hydrolysis, but do not satisfy the stringent flameproofing requirements that thin-wall housing applications have to meet. PC/ABS molding compositions are also described in WO 00/46298. These, however, are based on readily volatile monophosphates as flame-retardant additives and do not exhibit a satisfactory processing behavior in injection molding.

EP-A 1 026 205 describes flameproofed PC/ABS compositions containing silicate materials such as talcum or wollastonite that are also characterized by improved hydrolysis behavior but insufficient flame resistance for thin-wall applications.

WO 00/39210 also describes reinforced PC/ABS compositions having an improved resistance to hydrolysis, that have been flameproofed with special phosphoric acid esters having a low acid number. Talcum or mixtures of talcum and glass fibres among other substances may be used as reinforcing material. The described molding compositions have an insufficient toughness.

JP-A 11 199 768 describes PC/ABS compositions with phosphoric acid esters as flameproofing additives and that contain inorganic fillers such as talcum. The molding compositions are characterized by an excellent flame resistance (UL 94 V-0 rating for wall thicknesses $\leq 1.0$ mm) as well as by a good thermal stability and notch-impact resistance. These molding compositions have an unsatisfactory processing behavior however.

The flameproofed PC/ABS molding compositions described in WO 01/48074 containing particularly pure talcum are characterized by improved stress-crack behavior, high rigidity and good flame resistance. However, they do not satisfy the stringent requirements in regard to the processing behavior (avoidance of tool plate outs), thermal stability as well as toughness and flow line strength of many thin-wall housing applications.

DETAILED DESCRIPTION OF THE INVENTION

The object of the present invention was accordingly to develop flameproofed molding compounds and compositions that are suitable in particular for the production of thin-wall housing parts such as handhelds (PDAs) and notebooks. Such molding compositions have to satisfy stringent requirements of various types, including in particular:

a.) flame resistance according to UL 94 V-0 at $\leq 1.0$ mm, preferably $\leq 0.9$ mm, in particular $\leq 0.8$ mm,
b.) no "juicing", i.e., no outgassing/bleeding during injection molding processing that lead to downtimes for cleaning the mold in the production of the molded part and/or cause difficulties on account of oily deposits on the surfaces of the molded parts during their surface treatment by, for example, lacquering or metalization,
c.) thermal stability according to HDT/A of at least 80° C., preferably at least 83° C., in particular at least 85° C.,
d.) sufficient toughness at room temperature,
e.) flow line strength of at least 5 kJ/m$^2$, preferably at least 6 kJ/m$^2$, in particular at least 7 kJ/m$^2$, measured according to ISO 179/1eU, and
f.) adequate flowability for the production of the thin-wall molded parts as well as to avoid internal stresses that can lead to fracture ("cracking") under long-term mechanical stress, and in particular also under the influence of chemicals.

This object is achieved by special impact-resistant modified flameproofed polycarbonate molding compositions that have a rubber content, referred to the total composition, of 2 to 6 wt. %, preferably 4 to 6 wt. %.

The present invention accordingly provides compositions containing

A) 50 to 90 parts by weight, preferably 60 to 85 parts by weight, in particular 65 to 80 parts by weight, of aromatic polycarbonate and/or polyester carbonate,
B) 5 to 20 parts by weight, preferably 8 to 18 parts by weight, in particular 10 to 15 parts by weight, of rubber-modified vinyl (co)polymer,
C) 2 to 15 parts by weight, preferably 5 to 14 parts by weight, in particular 10 to 13.5 parts by weight, of at least one low-volatility, halogen-free flameproofing agent, preferably an oligomeric phosphoric acid ester, in particular one based on bisphenol A or based on a bisphenol A derivative,
D) 0.1 to 6 parts by weight, preferably 1 to 5 parts by weight, particularly preferably 2 to 4.5 parts by weight, of a silicate mineral, preferably a talcum or wollastonite, in particular a wollastonite,
E) 0 to 1 part by weight, preferably 0.1 to 0.5 part by weight, of fluorinated polyolefin, and
F) 0 to 10 parts by weight, preferably 0.1 to 5 parts by weight of commercially available polymer additives, in which the composition has a rubber content, referred to the total composition, of at least 2 wt. % and at most 6 wt. %, preferably from 4 to 6 wt. %, and in which the sum total of the parts by weight of the components A) to F) is 100.

The compositions have at typical processing temperatures preferably a weight loss of at most 0.8 wt. %, particularly preferably at most 0.5 wt. %, referred to the total composition, this weight loss being measured by means of dynamical thermogravimetric analysis (TGA) in a nitrogen gas stream of 50 ml/min with a heating rate of 10 K/min at a temperature of 280° C.

Component A

Suitable aromatic polycarbonates and/or aromatic polyester carbonates of component A according to the invention are known in the literature or may be produced by processes known in the literature (for the production of aromatic polycarbonates see for example Schnell, "Chemistry and Physics of Polycarbonates", Interscience Publishers, 1964 as well as DE-AS 1 495 626, DE-A 2 232 877, DE-A 2 703 376, DE-A 2 714 544, DE-A 3 000 610, DE-A 3 832 396; for the production of aromatic polyester carbonates see for example DE-A 3 077 934).

The production of aromatic polycarbonates is carried out for example by reacting diphenols with carbonic acid halides, preferably phosgene, and/or with aromatic dicarboxylic acid dihalides, preferably benzenedicarboxylic acid dihalides, according to the phase interface process, optionally with the use of chain terminators, for example monophenols, and optionally with the use of trifunctional or higher functional branching agents, for example triphenols or tetraphenols.

Diphenols suitable for the production of the aromatic polycarbonates and/or aromatic polyester carbonates are preferably those of the formula (I)

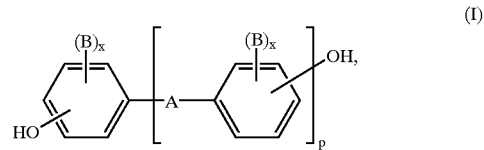

in which
A denotes a single bond, C$_1$ to C$_5$-alkylene, C$_2$ to C$_5$-alkylidene, C$_5$ to C$_6$-cycloalkylidene, —O—, —SO—, —CO—, —S—, —SO$_2$—, C$_6$ to C$_{12}$-arylene, onto which further aromatic rings, optionally containing heteroatoms, may be condensed,
or a radical of the formula (II) or (III)

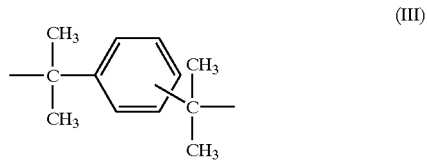

B in each case denotes C$_1$ to C$_{12}$-alkyl, preferably methyl, halogen, preferably chlorine and/or bromine,
x in each case independently of one another denotes 0, 1 or 2,
p is 1 or 0, and
R$^5$ and R$^6$ may be chosen individually for each X$^1$, and independently of one another denote hydrogen or C$_1$ to C$_6$-alkyl, preferably hydrogen, methyl or ethyl,
X$^1$ denotes carbon, and
m is a whole number from 4 to 7, preferably 4 or 5, with the proviso that on at least one atom X$^1$, R$^5$ and R$^6$ are simultaneously alkyl.

Preferred diphenols are hydroquinone, resorcinol, dihydroxydiphenols, bis-(hydroxyphenyl)-C$_1$–C$_5$-alkanes, bis-(hydroxyphenyl)-C$_5$–C$_6$-cycloalkanes, bis-(hydroxyphenyl)-ethers, bis-(hydroxyphenyl)-sulfoxides, bis-(hydroxyphenyl)-ketones, bis-(hydroxyphenyl)-sulfones and α,α-bis-(hydroxyphenyl)-diisopropylbenzenes as well as their nuclear-brominated and/or nuclear-chlorinated derivatives.

Particularly preferred diphenols include 4,4'-dihydroxydiphenyl, bisphenol A, 2,4-bis(4-hydroxyphenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenyl sulfide, 4,4'-dihydroxydiphenyl sulfone as well as their dibrominated and tetrabrominated or chlorinated derivatives such as for example 2,2-bis(3-chloro-4-hydroxyphenyl)-propane, 2,2-bis(3,5-dichloro-4-hydroxyphenyl)-propane or 2,2-bis(3,5-dibromo-4-hydroxyphenyl)-propane. Particularly preferred is 2,2-bis(4-hydroxyphenyl)-propane (bisphenol A).

The diphenols may be used individual or as arbitrary mixtures with one another. The diphenols are known in the literature or may be obtained by processes known in the literature.

Suitable chain terminators for the production of the thermoplastic, aromatic polycarbonates include for example phenol, p-chlorophenol, p-tert.-butylphenol or 2,4,6-tribromophenol, as well as long-chain alkylphenols such as 4-(1,3-tetramethylbutyl)-phenol according to DE-A 2 842 005, or monoalkylphenols or dialkylphenols with a total of 8 to 20 carbon atoms in the alkyl substituents, such as 3,5-di-tert.-butylphenol, p-iso-octylphenol, p-tert.-octylphenol, p-dodecylphenol, and 2-(3,5-dimethylheptyl)-phenol and 4-(3,5-dimethylheptyl)-phenol. The amount of chain terminators to be used is in general between 0.5 mole % and 10 mole %, referred to the molar sum of the diphenols used in each case.

The thermoplastic, aromatic polycarbonates have weight average molecular weights ($M_w$, measured for example by ultracentrifugation or light-scattering measurements) of 10,000 to 200,000, preferably 15,000 to 80,000.

The thermoplastic, aromatic polycarbonates may be branched in a known manner, and more specifically preferably by the incorporation of 0.05 to 2.0 mole %, referred to the sum of the diphenols used, of trifunctional or higher than trifunctional compounds, for example those with three and more phenolic groups.

Both homopolycarbonates as well as copolycarbonates are suitable. For the production of copolycarbonates of component A according to the invention there may also be used 1 to 25 wt. %, preferably 2.5 to 25 wt. %, referred to the total amount of diphenols used, of polydiorganosiloxanes with hydroxyaryloxy terminal groups. These are known (for example from U.S. Pat. No. 3,419,634) and/or may be prepared according to processes known in the literature. The production of polydiorganosiloxane-containing copolycarbonates is described in DE-A 3 334 782.

Preferred polycarbonates include, besides the bisphenol A homopolycarbonates, also the copolycarbonates of bisphenol A with up to 15 mole %, referred to the molar sum of diphenols, other than preferred and/or particularly preferred aforementioned diphenols.

Aromatic dicarboxylic acid dihalides used for the production of aromatic polyester carbonates are preferably the diacid dichlorides of isophthalic acid, terephthalic acid, diphenylether-4,4'-dicarboxylic acid and naphthalene-2,6-dicarboxylic acid.

Particularly preferred are mixtures of the diacid dichlorides of isophthalic acid and terephthalic acid in a ratio between 1:20 and 20:1.

In the production of polyester carbonates, a carbonic acid halide, preferably phosgene, is additionally co-used as bifunctional acid derivative.

As chain terminators for the production of the aromatic polyester carbonates, there may suitably be used, apart from the already mentioned monophenols, also their chlorocarbonic acid esters as well as the acid chlorides of aromatic monocarboxylic acids that may optionally be substituted by $C_1$ to $C_{22}$-alkyl groups or by halogen atoms, as well as aliphatic $C_2$ to $C_{22}$-monocarboxylic acid chlorides.

The amount of chain terminators is in each case 0.1 to 10 mole %, referred in the case of phenolic chain terminators to moles of diphenol, and in the case of monocarboxylic acid chloride chain terminators, to moles of dicarboxylic acid dichlorides.

The aromatic polyester carbonates may also contain incorporated aromatic hydroxycarboxylic acids.

The aromatic polyester carbonates may be linear as well as, in a known manner, branched (see in this connection DE-A 2 940 024 and DE-A 3 007 934).

As branching agents, there may, for example, be used trifunctional or higher functional carboxylic acid chlorides such as trimesic acid trichloride, cyanuric acid trichloride, 3,3',4,4'-benzophenonetetracarboxylic acid tetrachloride, 1,4,5,8-naphthalenetetra-carboxylic acid tetrachloride or pyromellitic acid tetrachloride, in amounts of 0.01 to 1.0 mole % (referred to dicarboxylic acid dichlorides used) or trifunctional or higher functional phenols such as phloroglucinol, 4,6-dimethyl-2,4,6-tri-(4-hydroxyphenyl)-heptene-2,4,4-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis-(4-hydroxyphenyl) cyclohexyl]-propane, 2,4-bis-(4-hydroxy-phenylisopropyl)-phenol, tetra-(4-hydroxyphenyl)-methane, 2,6-bis-(2-hydroxy-5-methylbenzyl)-4-methylphenol, 2-(4-hydroxyphenyl)-2-(2, 4-dihydroxyphenyl)-propane, tetra-(4-[4-hydroxyphenylisopropyl]phenoxy)-methane, 1,4-bis-[4,4'-dihydroxytriphenyl)methyl]-benzene, in amounts of 0.01 to 1.0 mole %, referred to diphenols used. Phenolic branching agents may be added together with the diphenols, while acid chloride branching agents may be introduced together with the acid dichlorides.

The proportion of carbonate structure units may vary arbitrarily in the thermoplastic, aromatic polyester carbonates. The proportion of carbonate groups is preferably up to 100 mole %, in particular up to 80 mole %, particularly preferably up to 50 mole %, referred to the sum total of ester groups and carbonate groups. Both the ester proportion as well as the carbonate proportion of the aromatic polyester carbonates may be present in the form of blocks or randomly distributed in the polycondensate.

The relative solution viscosity ($\eta_{rel.}$) of the aromatic polycarbonates and polyester carbonates is in the range of 1.18 to 1.4, preferably 1.20 to 1.32 (measured in solutions of 0.5 g of polycarbonate or polyester carbonate in 100 ml of methylene chloride solution at 25° C.).

The thermoplastic, aromatic polycarbonates and polyester carbonates may be used alone or in arbitrary mixtures. They may be contained in the composition according to the invention in an amount of preferably 50 to 90 parts by weight, in particular 60 to 85 parts by weight, and more particularly preferably 65 to 80 parts by weight.

Component B

The component B comprises graft polymers B1 of at least one vinyl monomer grafted on at least one rubber with a glass transition temperature <10° C. as graft base.

Preferred graft polymers B1 are one or more graft polymers of 5 to 95 wt. %, preferably 20 to 90 wt. %, of a mixture of:

1. 50 to 99 wt. %, in particular 50 to 90 wt. %, more preferably 55 to 85 wt. % and most particularly preferably 60 to 80 wt. %, of vinyl aromatic compounds and/or nuclear-substituted vinyl aromatic compounds (such as for example styrene, α-methylstyrene, p-methylstyrene, p-chlorostyrene) and/or methacrylic acid —($C_1$–$C_8$)-alkyl esters (such as methyl methacrylate and ethyl methacrylate) and 2. 1 to 50 wt. %, in particular 10 to 50 wt. %, more preferably 15 to 45 wt. % and most particularly preferably 20 to 40 wt. %, of vinyl cyanides (unsaturated nitriles such as acrylonitrile and methacrylonitrile) and/or (meth) acrylic acid-($C_1$–$C_8$)-alkyl esters (such as methyl methacrylate, n-butyl acrylate and tert.-butyl acrylate) and/or derivatives (such as anhydrides and imides) of unsaturated carboxylic acids (for example maleic anhydride and N-phenylmaleimide) on 95 to 5 wt. %, preferably 80 to 10 wt. % of one or more rubbers with glass transition temperatures <10° C., preferably <0° C., particularly preferably <−20° C. as graft base.

The graft base generally has a mean particle size ($d_{50}$ value) of 0.05 to 10 µm, preferably 0.1 to 5 µm, particularly preferably 0.2 to 1 µm.

The mean particle size $d_{50}$ is the diameter above and below which in each case 50 wt. % of the particles lie, and may be determined by ultracentrifuge measurements (W. Scholtan, H. Lange, Kolloid, Z. und Z. Polymere 250 (1972), 782–796).

Preferred monomers of group 1 are selected from at least one of monomer styrene, α-methylstyrene and methyl methacrylate, and preferred monomers of group 2 are selected from at least one of monomer acrylonitrile, maleic anhydride and methyl methacrylate.

Particularly preferred monomers are styrenes from group 1 and acrylonitrile from group 2.

For the graft polymers B1, suitable graft bases include, for example, diene rubbers, EP(D)M rubbers, i.e., those based on ethylene/propylene and optionally diene, acrylate, polyurethane, silicone, chloroprene and ethylene/vinyl acetate rubbers as well as composite rubbers consisting of two or more of the aforementioned systems.

Preferred graft bases are diene rubbers (e.g., based on butadiene, isoprene, etc.) or mixtures of diene rubbers or copolymers of diene rubbers or their mixtures with further copolymerisable monomers (e.g., according to the above specified groups 1 and 2), such as, for example, butadiene/styrene copolymers, with the proviso that the glass transition temperature of the graft base is <10° C., preferably <0° C., particularly preferably <−10° C.

Polybutadiene rubber is particularly preferred.

Particularly preferred graft polymers B1 are, for example, ABS polymers (emulsion, bulk and suspension ABS) such as are described for example in DE-A 2 035 390 (U.S. Pat. No. 3,644,574) or in DE-A 2 248 242 (=GB-PS 1 409 275) or in Ullmanns Enzyklopädie der Technischen Chemie, Vol. 19 (1980), p. 280 ff. The gel content of the graft base is at least 30 wt. %, preferably at least 40 wt. %.

The gel content of the graft base is determined at 25° C. in toluene (M. Hoffmann, H. Krömer, R. Kuhn, Polymeranalytik I and II, Georg Thieme-Verlag, Stuttgart 1977).

The graft copolymers B1 are produced by free-radical polymerisation, e.g. by emulsion, suspension, solution or bulk polymerisation, preferably by emulsion or bulk polymerisation.

Particularly suitable graft rubbers are also ABS polymers that are produced by redox initiation with an initiator system of organic hydroperoxide and ascorbic acid according to U.S. Pat. No. 4,937,285.

Since in the grafting reaction, the graft monomers are, as is known, not necessarily completely grafted onto the graft base, according to the invention, the term graft polymer is also understood to include those products that are obtained by (co)polymerisation of the graft monomers in the presence of the graft base and that occur during the working-up.

Suitable acrylate rubbers, as graft base, are preferably polymers of acrylic acid alkyl esters, and optionally also copolymers with up to 40 wt. % referred to the graft base of other polymerisable, ethylenically unsaturated monomers. The preferred polymerisable acrylic acid esters include $C_1$ to $C_8$-alkyl esters, for example, methyl, ethyl, butyl, n-octyl and 2-ethylhexyl esters, halogenated alkyl esters, preferably halogen-$C_1$–$C_8$-alkyl esters such as chloroethyl acrylate, as well as mixtures of these monomers.

For the crosslinking, monomers containing more than one polymerisable double bond may be copolymerised. Preferred examples of crosslinking monomers are esters of unsaturated monocarboxylic acids with 3 to 8 C atoms and unsaturated monohydric alcohols with 3 to 12 C atoms, or saturated polyols with 2 to 4 OH groups and 2 to 20 C atoms, such as ethylene glycol dimethacrylate, allyl methacrylate; multiple unsaturated heterocyclic compounds such as trivinyl cyanurate and triallyl cyanurate; polyfunctional vinyl compounds such as divinylbenzenes and trivinylbenzenes; and also triallyl phosphate and diallyl phthalate.

Preferred crosslinking monomers are allyl methacrylate, ethylene glycol dimethacrylate, diallyl phthalate and heterocyclic compounds that contain at least three ethylenically unsaturated groups.

Particularly preferred crosslinking monomers are the cyclic monomers triallyl cyanurate, triallyl isocyanurate, triacryloylhexahydro-s-triazine, and triallylbenzenes. The amount of the crosslinking monomers is preferably 0.02 to 5 wt. %, in particular 0.05 to 2 wt. %, referred to the graft base.

In the case of cyclic crosslinking monomers containing at least three ethylenically unsaturated groups, it is advantageous to restrict the amount to below 1 wt. % of the graft base.

Preferred "other" polymerisable ethylenically unsaturated monomers that apart from the acrylic acid esters may optionally serve for the production of the graft base, include, for example, acrylonitrile, styrene, α-methylstyrene, acrylamides, vinyl-$C_1$–$C_6$-alkyl ethers, methyl methacrylate and butadiene. Preferred acrylate rubbers as graft base are emulsion polymers that have a gel content of at least 60 wt. %.

Further suitable graft bases are silicone rubbers with graft-active sites, such as are described in DE-A 3 704 657, DE-A 3 704 655, DE-A 3 631 540 and DE-A 3 631 539.

Component B may furthermore contain one or more thermoplastic vinyl (co)polymers B2 in which the aforementioned graft polymers B1 are preferably present in dispersed form in the composition according to the invention.

Suitable as vinyl (co)polymers B2 are polymers of at least one monomer from the group comprising vinyl aromatic compounds, vinyl cyanides (unsaturated nitriles), (meth) acrylic acid ($C_1$–$C_8$) alkyl esters, unsaturated carboxylic acids as well as derivatives (such as anhydrides and imides) of unsaturated carboxylic acids. Particularly suitable are (co)polymers of:

50 to 99 wt. %, preferably 60 to 80 wt. %, of vinyl aromatic compounds and/or nuclear-substituted vinyl aromatic compounds such as, for example styrene, α-methylstyrene, p-methylstyrene, p-chlorostyrene and/or methacrylic acid-($C_1$–$C_8$)-alkyl esters such as methyl methacrylate, ethyl methacrylate, and 1 to 50 wt. %, preferably 20 to 40 wt. %, of vinyl cyanides (unsaturated nitriles) such as acrylonitrile and methacrylonitrile and/or (meth)acrylic acid-($C_1$–$C_8$)-alkyl esters (such as methyl methacrylate, n-butyl acrylate, tert.-butyl acrylate) and/or unsaturated carboxylic acids (such as maleic acid) and/or derivatives (such as anhydrides and imides) of unsaturated carboxylic acids (for example maleic anhydride and N-phenylmaleimide).

The (co)polymers B2 are resin-like and thermoplastic.

The copolymer of styrene and acrylonitrile is particularly preferred.

The (co)polymers according to B2 are known and can be produced by free-radical polymerisation, in particular, by emulsion, suspension, solution or bulk polymerisation. The (co)polymers preferably have molecular weights $M_w$ (weight average, determined by light scattering or sedimentation measurements) between 15,000 and 200,000.

The component B may be used in the molding compositions according to the invention in amounts of 5 to 20 parts by weight, preferably 8 to 18 parts by weight, in particular 10 to 15 parts by weight.

Component C

The compositions contain low-volatility halogen-free flameproofing agents. The following may be mentioned by way of example of such flameproofing agents: phosphorus-containing compounds such as oligomeric phosphoric acid esters and phosphonic acid esters, phosphonate amine and phosphazenes, as well as silicones, in which connection mixtures of several of the aforementioned components may also be used as flameproofing agents. There may also be used other low-volatility flameproofing agents not specifically mentioned here, in particular phosphorus compounds, which may be used alone or in arbitrary combinations with one another.

There are preferably used as flame-retardant additives those oligomeric phosphoric acid and phosphonic acid esters of the general formula (IV)

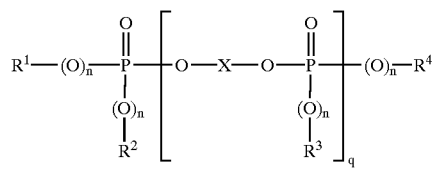

(IV)

in which
$R^1, R^2, R^3$ and $R^4$ independently of one another in each case denote $C_1$ to $C_8$-alkyl, or $C_5$ to $C_6$-cycloalkyl, $C_6$ to $C_{20}$-aryl or $C_7$ to $C_{12}$-aralkyl in each case optionally substituted by alkyl, preferably $C_1$ to $C_4$-alkyl,
n independently of one another is 0 or 1,
q is 0.9 to 30, and
X denotes a mononuclear or polynuclear aromatic radical with 6 to 30 C atoms, or a linear or branched aliphatic radical with 2 to 30 C atoms, which may be OH-substituted and may contain up to 8 ether bonds.

Preferably $R^1$, $R^2$, $R^3$ and $R^4$ independently of one another denote $C_1$ to $C_4$-alkyl, phenyl, naphthyl or phenyl-$C_1$–$C_4$-alkyl. The aromatic groups $R^1$, $R^2$, $R^3$ and $R^4$ may in turn be substituted by alkyl groups, preferably $C_1$ to $C_4$-alkyl. Particularly preferred aryl radicals are cresyl, phenyl, xylenyl, propylphenyl or butylphenyl.

X in the formula (IV) preferably denotes a mononuclear or polynuclear aromatic radical with 6 to 30 C atoms. This is preferably derived from diphenols of the formula (I).
n in the formula (IV) may independently of one another be 0 or 1, and n is preferably equal to 1.
q denotes values from 0.9 to 30, preferably 1 to 15, particularly preferably 1 to 5, especially 1 to 2.

X preferably denotes

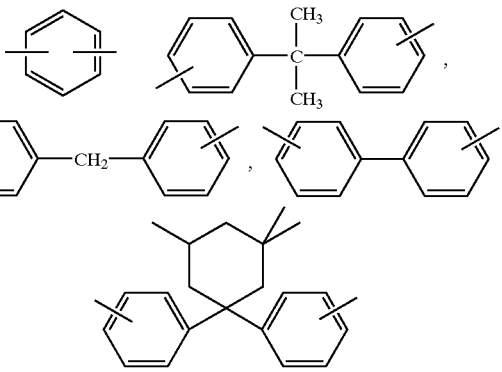

and in particular X is derived from resorcinol, hydroquinone, bisphenol A or diphenylphenol. Particularly preferably X is derived from bisphenol A.

Further preferred phosphorus-containing compounds are compounds of the formula (Va)

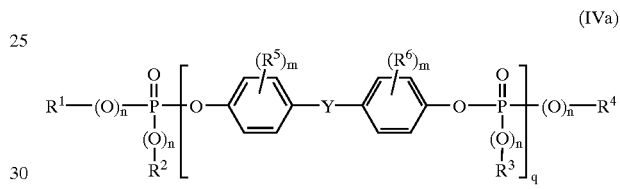

(IVa)

in which
$R^1, R^2, R^3, R^4$, n and q have the meanings given in formula (IV),
m independently of one another is 0, 1, 2, 3 or 4,
$R^5$ and $R^6$ independently of one another denote $C_1$ to $C_4$-alkyl, preferably methyl or ethyl, and
Y denotes $C_1$ to $C_7$-alkylidene, $C_1$ to $C_7$-alkylene, $C_5$ to $C_{12}$-cycloalkylene, $C_5$ to $C_{12}$-cycloalkylidene, —O—, —S—, —SO$_2$— or —CO—, preferably isopropylidene or methylene.

Mixtures of several components according to formulae (IV) and (IVa) may also preferably be used, in which connection these may differ both in their chemical structure as well as in the degree of oligomerisation q.

As component C according to the invention there may also be used monophosphates (q=0), optionally mixed with other compounds so long as these are either of sufficiently low volatility per se or can be used in sufficiently small concentrations.

The phosphorus compounds according to component C are known (see for example EP-A 0 363 608, EP-A 0 640 655) or can be produced in a similar manner by known methods (see, for example, Ullmanns Enzyklopädie der Technischen Chemie, Vol. 18, p. 301 ff. 1979; Houben-Weyl, Methoden der Organischen Chemie, Vol. 12/1, p. 43; Beilstein Vol. 6, p. 177).

The mean q values may be derived by determining the composition of the phosphate mixture (molecular weight distribution) by means of suitable methods (gas chromatography (GC), high pressure liquid chromatography (HPLC), gel permeation chromatography (GPC)) and calculating therefrom the mean values for q.

The component C may be used in the compositions according to the invention in amounts of 2 to 15 parts by weight, preferably 5 to 14 parts by weight, in particular 10 to 13.5 parts by weight.

Component D

As silicate material there may be used all natural or synthetically produced salts of silicic acid as well as all salts that are derived from silicic acid. The silicate minerals are generally known and can be obtained commercially.

Preferably, inorganic materials such as talcum, wollastonite or mixtures of talcum and wollastonite are used. Wollastonite is particularly preferred. The inorganic materials may be surface-treated, for example, silanised, in order to ensure a better polymer compatibility. The component D may be used in the compositions according to the invention in amounts of 0.1 to 6 parts by weight, preferably 1 to 5 parts by weight, particularly preferably 2 to 4.5 parts by weight.

Component E

The flameproofing agents corresponding to component C are often used in combination with so-called anti-drip agents, which reduce the tendency of the material to form burning droplets in the event of fire. By way of example, there may be mentioned here compounds from the classes of substances comprising fluorinated polyolefins, silicones as well as aramide fibres. These may also be employed in the compositions according to the invention. Fluorinated polyolefins are preferably used as anti-drip agents.

Fluorinated polyolefins are known and are described for example in EP-A 0 640 655. They are marketed by DuPont, for example, under the trade name Teflon® 30N.

The fluorinated polyolefins may be used in pure form as well as in the form of a coagulated mixture of emulsions of the fluorinated polyolefins with emulsions of the graft polymers (component B) or with an emulsion of a copolymer, preferably based on styrene/acrylonitrile, in which the fluorinated polyolefin is mixed as an emulsion with an emulsion of the graft polymer or of the copolymer and is then coagulated.

Furthermore, the fluorinated polyolefins may be employed as pre-compound with the graft polymer (component B) or with a copolymer, preferably based on styrene/acrylonitrile. The fluorinated polyolefins are mixed as powder with a powder or granular material of the graft polymer or copolymer and compounded in the melt in general at temperatures from 200° to 330° C. in conventional equipment such as internal kneaders, extruders or double-shaft screw extruders.

The fluorinated polyolefins may also be used in the form of a master batch that is produced by emulsion polymerisation of at least one monoethylenically unsaturated monomer in the presence of an aqueous dispersion of the fluorinated polyolefin. Preferred monomer components are styrene, acrylonitrile and their mixtures. The polymer is used after precipitation with an acid and subsequent drying as a flowable powder.

The coagulates, pre-compounds or master batches usually have solids contents of fluorinated polyolefin of 5 to 95 wt. %, preferably 7 to 80 wt. %.

The fluorinated polyolefins may be employed in concentrations of 0 to 1 part by weight, preferably 0.1 to 0.5 part by weight, these quantitative figures referring to the pure fluorinated polyolefin in the case of the use of a coagulate, precompound or master batch.

Component F (Further Additives)

The compositions according to the invention may furthermore contain up to 10 parts by weight, preferably 0.1 to 5 parts by weight, of at least one conventional polymer additive such as a lubricant or mold release agent, for example pentaerythritol tetrastearate, a nucleating agent, an antistatic, a stabiliser or a filler and reinforcing agent as well as a dye or pigment.

All figures relating to parts by weight in this application are standardised so that the sum total of the parts by weight of all components in the composition is 100.

The compositions according to the invention are produced by mixing the respective constituents in a known manner and melt-compounding and melt-extruding the compositions at temperatures of 200° C. to 300° C. in conventional equipment such as internal kneaders, extruders and double-shaft screw extruders.

The mixing of the individual constituents may be carried out in a known manner successively, as well as simultaneously, and more specifically at about 20° C. (room temperature) as well as at higher temperatures.

The molding compositions according to the invention may be used to produce all types of molded parts. These may be produced by injection molding, extrusion and blow molding processes. A further form of processing is the production of molded parts by thermoforming from previously fabricated sheets or films.

Examples of such molded parts are sheets, profiled sections, all types of housing parts, e.g., for domestic appliances such as juice presses, coffee-making machines, mixers; for office equipment such as monitors, printers, copiers; also panels, tubing, electrical installation ducting, profiled sections for internal and external applications in the building and construction sector; parts from the electrical equipment sector such as switches and plugs, as well as internal and external vehicle parts.

In particular, the molding compositions, according to the invention, may be used for example to produce the following molded parts:

Internal structural parts for tracked vehicles, boats, aircraft, buses and automobiles, wheelcaps, housings for electrical equipment containing small transformers, housings for equipment for information processing and transmission, housings and casings for medical purposes, massage equipment and housings therefor, children's toys, two-dimensional wall elements, housings for safety devices and equipment, rear spoilers, vehicle body parts, thermally insulated transportation containers, devices for holding or looking after small animals, molded parts for sanitaryware and bathroom fittings, cover gratings for ventilator openings, molded parts for garden sheds and equipment housings, and housings for gardening tools.

The compositions are particularly preferably used in the production of thin-wall housing parts by injection molding; the following may be mentioned by way of example: notebooks, handhelds (PDAs) and mobile phone casings.

The invention is further illustrated but is not intended to be limited by the following examples in which all parts and percentages are by weight unless otherwise specified.

EXAMPLES

The components listed in Table 1 and described briefly hereinafter were melt-compounded in a ZSK-25 machine at 240° C. The test specimens were produced in an Arburg 270 E type injection molding machine at 240° C.

Component A1

Linear polycarbonate based on bisphenol A with a relative solution viscosity of 1.24 measured in $CH_2Cl_2$ as solvent at 25° C. and in a concentration of 0.5 g/100 ml.

Component A2

Linear polycarbonate based on bisphenol A with a relative solution viscosity of 1.25 measured in $CH_2Cl_2$ as solvent at 25° C. and in a concentration of 0.5 g/100 ml.

Component B

B1: Graft polymer of 40 parts by weight of a copolymer of styrene and acrylonitrile in a ratio of 73:27 on 60 parts by weight of particulate crosslinked polybutadiene rubber (mean particle diameter $d_{50}=0.3$ μm) produced by emulsion polymerisation.

B2: Styrene/acrylonitrile copolymer with a styrene/acrylonitrile weight ratio of 72:28 and an intrinsic viscosity of 0.55 dl/g (measured in dimethyl-formamide at 20° C.).

Component C1

Bisphenol A-based oligophosphate

[Chemical structure of bisphenol A-based oligophosphate with q=1,1]

Component C2

Mixture of 3 parts by weight of m-phenylene-bis-diphenyl phosphate (Fyrolflex® RDP from Akzo Nobel Chemicals GmbH, 52349 Düren, Germany) and 1 part by weight of triphenyl phosphate (Disflamoll® TP, Bayer AG).

Component D1

Naintsch A3: talcum from Naintsch Mineralwerke GmbH, Graz, Austria

Component D2

Westmin 8: talcum from Omya GmbH, Cologne, Germany

Component D3

Pural 200: nanoscale boehmite AlO(OH) from Condea Chemie GmbH, Hamburg, Germany

Component D4

Nyglos® 4: wollastonite from NYCO Minerals Inc., Willsboro, N.Y., USA

Component D5

Wolkron® 5: wollastonite from Heinrich Osthoff-Petrasch GmbH & Co., KG, Norderstedt, Germany Component D6

Nyglos® 5: wollastonite from NYCO Minerals Inc., Willsboro, N.Y., USA

Component E

Tetrafluoroethylene polymer as a coagulated mixture of a graft polymer emulsion according to component B1 in water and a tetrafluoroethylene polymer emulsion in water. The weight ratio of graft polymer B1 to tetrafluoroethylene polymer in the mixture is 90 wt. % to 10 wt. %. The tetrafluoroethylene polymer emulsion has a solids content of 60 wt. %, and the mean particle diameter is between 0.05 and 0.5 μm. The graft polymer emulsion has a solids content of 34 wt. %.

The emulsion of the tetrafluoroethylene polymer (Teflon® 30 N from DuPont) is mixed with the emulsion of the graft polymer B1 and stabilised with 1.8 wt. %, referred to polymer solids, of phenolic antioxidants. The mixture is coagulated at 85° to 95° C. with an aqueous solution of $MgSO_4$ (Epsom salt) and acetic acid at pH 4 to 5, filtered and washed until practically free from electrolyte, then freed from the majority of the water by centrifugation and finally dried at 100° C. to form a powder.

Component F1

Pentaerythritol tetrastearate (PETS) as mold release agent.

Component F2

Phosphite stabiliser.

Investigation of the Properties of the Molding Compositions According to the Invention In order to determine the flow line strength, the impact resistance at the flow line of test bodies of dimensions 170 mm×10 mm×4 mm gated on both sides (processing temperature: 240° C.) is measured according to ISO 179/1eU.

The fire behavior of the flameproofed test specimens was measured according to UL-Subj. 94 V on rods of dimensions 127 mm×12.7 mm×1.2 mm/1.0 mm/0.8 mm.

The determination of the HDT/A is carried out according to ISO 75.

The determination of the melt viscosity is carried out according to DIN 54 811 at 260° C. and at a shear rate of 1,000 $s^{-1}$.

The toughness level is evaluated as to whether a fracture occurs at 23° C. in the impact bending test according to ISO 180-1U.

TABLE 1

| Components (figures in parts by weight) | V1 | V2 | 3 | 4 | V5 | 6 | 7 | 8 |
|---|---|---|---|---|---|---|---|---|
| A1 (PC) | 66.0 | 69.0 | 72.0 | 75.0 | 63.2 | 69.0 | 69.0 | 69.0 |
| A2 (PC) | — | — | — | — | — | — | — | — |
| B1 (graft) | 3.0 | 3.0 | 3.0 | 3.0 | 4.9 | 4.9 | 4.9 | 4.9 |
| B2 (SAN) | 5.0 | 5.0 | 5.0 | 5.0 | 4.9 | 4.9 | 4.9 | 4.9 |
| C1 (BDP) | 11.0 | 11.0 | 11.0 | 11.0 | 12.8 | 12.8 | 12.8 | 12.8 |
| C2 (RDP/TPP mixture) | — | — | — | — | — | — | — | — |
| D1 (talcum) Naintsch A3 | 10.0 | 7.0 | 4.0 | 1.0 | 9.8 | 4.0 | — | — |
| D2 (talcum) Westmin 8 | — | — | — | — | — | — | — | — |
| D3 (nano boehmite) Pural 200 | — | — | — | — | — | — | — | — |
| D4 (wollastonite) Nyglos 4 | — | — | — | — | — | — | 4.0 | — |
| D5 (wollastonite) Wolkron 1005 | — | — | — | — | — | — | — | 4.0 |
| D6 (wollastonite) Nyglos 5 | — | — | — | — | — | — | — | — |
| E (Teflon/B1 master batch 10:90) | 4.5 | 4.5 | 4.5 | 4.5 | 3.9 | 3.9 | 3.9 | 3.9 |
| G1 (mold release agent) | 0.4 | 0.4 | 0.4 | 0.4 | 0.4 | 0.4 | 0.4 | 0.4 |
| G2 (slabiliser) | 0.1 | 0.1 | 0.1 | 0.1 | 0.1 | 0.1 | 0.1 | 0.1 |
| ABS total[1)] | 12.1 | 12.1 | 12.1 | 12.1 | 13.3 | 13.3 | 13.3 | 13.3 |
| Rubber content in wt. %[2)] | 4.2 | 4.2 | 4.2 | 4.2 | 5.0 | 5.0 | 5.0 | 5.0 |
| UL 94 V (1.2 mm) | V-0 | V-0 | V-0 | V-0 | V-0 | V-0 | V-0 | V-1 |
| UL 94 V (1.0 mm) | V-0 | V-0 | V-0 | V-0 | V-0 | V-0 | V-0 | V-0 |

TABLE 1-continued

Molding compositions and their properties

| | | | | | | | | |
|---|---|---|---|---|---|---|---|---|
| UL 94 V (0.8 mm) | V-1 | V-0 | V-0 | V-0 | V-0 | V-0 | V-0 | V-0 |
| HDT/A [° C.] | 89 | 88 | 88 | 88 | 85 | 86 | 85 | 84 |
| $a_n$ (flow line) [kJ/m$^2$] | 4 | 5 | 6 | 8 | 3 | 6 | 8 | 10 |
| Impact bend, test according to ISO 180/1 U | Fracture | Fracture | No Fracture | No Fracture | Fracture | No Fracture | No Fracture | No Fracture |
| Melt viscosity (260° C./1000 s$^{-1}$) [Pas] | 181 | 182 | 184 | 181 | 150 | 171 | 164 | 156 |
| TGA (weight loss at 280° C.) [%] | n.m. | n.m. | n.m. | n.m. | 0.2 | n.m. | n.m. | n.m. |

[1] B1 + B2 + B1 from E (amount of B1 in E is 90 wt. % of E)
[2] Referred to the total composition
[3] n.m. = not measured

| Components (figures in parts by weight) | 9 | 10 | 11 | 12 | V13 | V14 | V15 | V16 |
|---|---|---|---|---|---|---|---|---|
| A1 (PC) | 69.0 | 70.0 | 74.0 | 71.0 | 73.0 | 65.3 | 65.3 | 71.2 |
| A2 (PC) | — | — | — | — | — | — | — | — |
| B1 (graft) | 4.9 | 4.9 | 3.0 | 5.0 | 5.0 | 7.0 | 7.0 | 5.0 |
| B2 (SAN) | 4.9 | 4.9 | 5.0 | 5.0 | 5.0 | 6.0 | 6.0 | 5.0 |
| C1 (BDP) | 12.8 | 12.8 | 12.5 | 12.5 | 12.5 | 14.6 | 14.6 | 13.0 |
| C2 (RDP/TPP mixture) | — | — | — | — | — | — | — | — |
| D1 (talcum) Naintsch A3 | 2.0 | 3.0 | 1.0 | 2.0 | — | 2.0 | — | — |
| D2 (talcum) Westmin 8 | — | — | — | — | — | — | — | — |
| D3 (nano boehmite) Pural 200 | — | — | — | — | — | — | — | 0.7 |
| D4 (wollastonite) Nyglos 4 | 2.0 | — | — | — | — | — | — | — |
| D5 (wollastonite) Wolkron 1005 | — | — | — | — | — | — | 2.0 | — |
| D6 (wollastonite) Nyglos 5 | — | — | — | — | — | — | — | — |
| E (Teflon/B1 master batch 10:90) | 3.9 | 3.9 | 4.0 | 4.0 | 4.0 | 4.6 | 4.6 | 4.6 |
| G1 (mold release agent) | 0.4 | 0.4 | 0.4 | 0.4 | 0.4 | 0.4 | 0.4 | 0.4 |
| G2 (stabiliser) | 0.1 | 0.1 | 0.1 | 0.1 | 0.1 | 0.1 | 0.1 | 0.1 |
| ABS total[1] | 13.3 | 13.3 | 11.6 | 13.6 | 13.6 | 17.1 | 17.1 | 14.1 |
| Rubber content in wt. %[2] | 5.0 | 5.0 | 4.0 | 5.2 | 5.2 | 6.7 | 6.7 | 5.5 |
| UL 94 V (1.2 mm) | V-0 | V-0 | V-0 | V-0 | V-1 | V-0 | V-0 | V-1 |
| UL 94 V (1.0 mm) | V-0 | V-0 | n.m. | n.m. | n.m. | V-0 | V-2 | n.m. |
| UL 94 V (0.8 mm) | V-0 | V-0 | V-0 | V-0 | V-2 | V-2 | n.m. | n.m. |
| HDT/A [° C.] | 85 | 85 | 86 | 86 | 85 | 79 | 78 | n.m. |
| $a_n$ (flow line) [kJ/m$^2$] | 7 | 7 | 8 | 8 | 9 | 7 | 9 | n.m. |
| Impact bending test | No Fracture | No Fracture | No Fracture | No Fracture | No Fracture | No Fracture | No Fracture | No Fracture |
| Melt viscosity (260° C./1000 s$^{-1}$) [Pas] | 164 | 170 | 182 | 177 | 163 | 151 | 154 | 170 |
| TGA (weight loss at 280° C.) [%] | n.m. | 0.3 | n.m. | n.m. | n.m. | 0.5 | n.m. | n.m. |

[1] B1 + B2 + B1 from E (amount of B1 in E is 90 wt. % of E)
[2] Referred to the total composition
[3] n.m. = not measured

| Components (figures in parts by weight) | V17 | V18 | V19 |
|---|---|---|---|
| A1 (PC) | 70.5 | — | 63.2 |
| A2 (PC) | — | 70.1 | — |
| B1 (graft) | 4.9 | 5.5 | 4.9 |
| B2 (SAN) | 4.9 | 6.1 | 4.9 |
| C1 (BDP) | 14.0 | — | 12.8 |
| C2 (RDP/TPP mixture) | — | 10.9 | — |
| D1 (talcum) Naintsch A3 | — | — | — |
| D2 (talcum) Westmin 8 | — | 2.5 | — |
| D3 (nano boehmite) Pural 200 | 0.7 | — | — |
| D4 (wollastonite) Nyglos 4 | — | — | — |
| D5 (wollastonite) Wolkron 1005 | — | — | — |
| D6 (wollastonite) Nyglos 5 | — | — | 9.8 |
| E (Teflon/B1 master batch 10:90) | 4.5 | 4.4 | 3.9 |
| G1 (mold release agent) | 0.4 | 0.4 | 0.4 |
| G2 (stabiliser) | 0.1 | 0.1 | 0.1 |
| ABS total[1] | 13.9 | 15.6 | 13.3 |
| Rubber content in wt. %[2] | 5.4 | 5.7 | 5.0 |
| UL 94 V (1.2 mm) | V-1 | V-0 | V-0 |
| UL 94 V (1.0 mm) | n.m. | V-2 | V-0 |
| UL 94 V (0.8 mm) | n.m. | n.m. | n.m. |
| HDT/A [° C.] | n.m. | 79 | 82 |
| $a_n$ (flow line) [kJ/m$^2$] | n.m. | n.m. | 9 |
| Impact bending test according to ISO 180/1 U | No Fracture | No Fracture | Fracture |
| Melt viscosity (260° C./1000 s$^{-1}$) [Pas] | 146 | 180 | 157 |
| TGA (weight loss at 280° C.) [%] | n.m. | 1.5 | n.m. |

[1] B1 + B2 + B1 from E (amount of B1 in E is 90 wt. % of E)
[2] Referred to the total composition
[3] n.m. = not measured From Table 1, it is clear that the polycarbonate compositions according to the invention satisfy the various aforementioned requirements.

In this connection, it is essential to maintain the specified quantitative amounts since otherwise at least one of the required properties will not be obtained:

a) With too high a rubber content the stringent flame resistance requirements are not met, while with too low a rubber content the toughness requirements are not met. If the higher rubber content molding compositions with too low a flame resistance are compensated by increasing the amount of flame-retardant additive, then the thermal stability falls below the required level (V14, V15).

b) With too high a content of flameproofing agent the required thermal stability is not met (V14, V15), while with too low a content the flame resistance is not ensured with thin wall thicknesses.

c) With too high a silicate content the mechanical performance is inadequate (toughness, flow line strength, see V1, V2, V5, V18), while with too low a silicate content and if other inorganic materials such as nanoscale boehmite are used, the flame resistance is not guaranteed (V13, V16, V17). Talcum (e.g., Examples 3 and 4), wollastonite (e.g., Examples 7 and 8) as well as mixtures of talcum and wollastonite (Example 9) are suitable as silicate.

When using wollastonites, irrespective of the type employed, advantages are obtained as regards the flow line strength compared to comparable molding compositions containing talcum (see V5 and V18), so that when using wollastonites slightly higher concentrations overall are possible.

Compositions containing monomeric phosphates (V18) have a higher weight loss at the processing temperature compared to the examples according to the invention.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising

A) 50 to 90 parts by weight of at least one a member selected from the group consisting of polycarbonate and polyester carbonate, B) 5 to 20 parts by weight of rubber-modified vinyl (co)polymer, C) 2 to 15 parts by weight of at least one halogen-free flameproofing agent conforming to

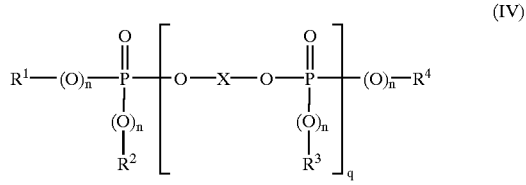

(IV)

in which $R^1$, $R^2$, $R^3$ and $R^4$ independently of one another denote $C_1$ to $C_8$-alkyl, $C_5$ to $C_6$-cycloalkyl, $C_6$ to $C_{20}$-aryl or $C_7$ to $C_{12}$-aralkyl, n independently of one another is 0 or 1, q is 0.9 to 30, and X denotes a member selected from the group consisting of

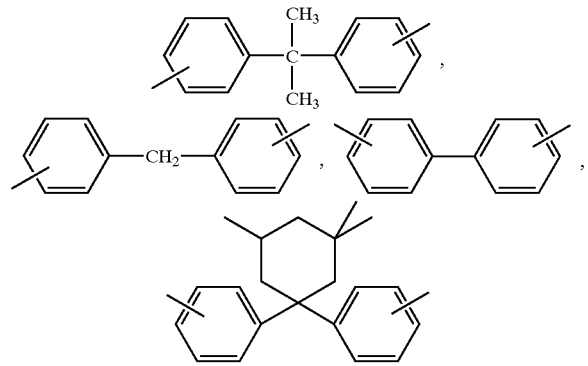

and a linear or branched aliphatic radical with 2 to 30 C atoms, which may be OH-substituted and may contain up to 8 ether bonds, D) 0.1 to 6 parts by weight of a silicate mineral, E) 0 to 1 part by weight of fluorinated polyolefin, and F) 0 to 10 parts by weight of at least one polymer additive selected from the group consisting of lubricant, mold release agent, nucleating agent, antistatic, stabiliser, filler different from Component D, reinforcing agent, dye and pigment, the total sum of the parts by weight of the components A) to F) being 100, and the rubber content of the composition referred to the weight of the composition being 2 to 6%.

2. The composition according to claim 1, in which the rubber content is 4 to 6 %.

3. The composition according to claim 1 wherein component C) is present in an amount of 5 to 14 parts by weight.

4. The composition according to claim 1 wherein component D) is present in an amount of 1 to 5 parts by weight.

5. The composition according to claim 1 wherein component D) is present in an amount of 2 to 4.5 parts by weight.

6. The composition according to claim 1 wherein component A) is present in an amount of 65 to 80 parts by weight.

7. The composition according to claim 1 wherein component C) is present in an amount of 10 to 13.5 parts by weight.

8. The composition according to claim 1 wherein component E) is present in an amount of 0.1 to 0.5 parts by weight.

9. The composition of claim 1 wherein $R^1$, $R^2$, $R^3$ and $R^4$ independently of one another are substituted by an alkyl radical.

10. The composition according to claim 1 in which q is 1 to 5.

11. The composition according to claim 1 in which component B) contains a graft polymer of at least one vinyl monomer grafted on at least one rubber with a glass transition temperature of <10° C. as graft base.

12. The composition according to claim 11, wherein component B) contains a graft polymer of 5 to 95 wt. % of a mixture of:

50 to 99 wt. % of at least one monomer selected from the group consisting of vinyl aromatic compound, nuclear-substituted vinyl aromatic compound and methacrylic acid —($C_1$–$C_8$)-alkyl esters and 1 to 50 wt. % of at least one monomer selected from the group consisting of vinyl cyanide, methacrylic acid —($C_1$–$C_8$)-alkyl ester, acrylic acid —($C_1$–$C_8$)-alkyl ester and derivative of unsaturated carboxylic acid on 95 to 5 wt. % of one or more rubbers with glass transition temperatures of <10° C.

13. The composition according to claim 12, in which a mixture of 50 to 99 wt. % of styrene and 1 to 50 wt. % of acrylonitrile is grafted onto the rubber.

14. The composition according to claim 12, in which the rubber is at least one member selected from the group consisting of diene rubber, acrylate rubber, silicone rubber and EPDM rubber.

15. The composition according to claim 14, in which the rubber is at least one member selected from the group consisting of partially crosslinked polybutadiene and butadiene/styrene copolymer.

16. The composition according to claim 1 wherein (B) is present in an amount of 10 to 15 parts by weight.

17. A molded article comprising the composition of claim 1.

* * * * *